United States Patent [19]

Bee

[11] Patent Number: 5,738,889
[45] Date of Patent: Apr. 14, 1998

[54] ICE CONTAINING CONFECTION

[75] Inventor: Rodney David Bee, St Neots, United Kingdom

[73] Assignee: Good Humor-Breyers Ice Cream, Division of Conopco, Inc., Green Bay, Wis.

[21] Appl. No.: 643,246

[22] Filed: May 3, 1996

[30] Foreign Application Priority Data

May 3, 1995 [EP] European Pat. Off. .............. 95303042

[51] Int. Cl.⁶ ....................................................... A23G 9/00
[52] U.S. Cl. ................................... 426/66; 62/1; 426/565
[58] Field of Search ........................... 426/66, 565, 660; 62/1

[56] References Cited

U.S. PATENT DOCUMENTS

| | | | |
|---|---|---|---|
| 3,619,205 | 11/1971 | Levan et al. | 62/1 |
| 4,031,262 | 6/1977 | Nakayama et al. | 426/565 |
| 4,310,559 | 1/1982 | Mita et al. | 426/565 |
| 4,353,927 | 10/1982 | Lovercheck | 426/565 |
| 5,437,886 | 8/1995 | Atkins et al. | 426/518 |

FOREIGN PATENT DOCUMENTS

| | | |
|---|---|---|
| 450692 | 10/1991 | European Pat. Off. . |
| 544349 | 6/1993 | European Pat. Off. . |
| 61-139342 | 6/1986 | Japan . |

OTHER PUBLICATIONS

Patent Abstracts of Japan JP 2023859.
Derwent Abstract of JP 2023859.
Patent Abstracts of Japan JP 6189686.
Derwent Abstracts of JP 6189686.
Patent Abstracts of Japan JP 61058562.
Derwent Abstract of JP 61058562.
Patent Abstracts of Japan JP 62036167.
Derwent Abstract of JP 61058563.

*Primary Examiner*—George Yeung
*Attorney, Agent, or Firm*—James J. Farrell

[57] ABSTRACT

A deformable ice confection giving a smooth mouth feel and refreshment from a high ice content which comprises smooth convex faced ice particles in a deformable medium, eg a syrup or ice cream.

7 Claims, No Drawings

ICE CONTAINING CONFECTION

FIELD OF THE INVENTION

This invention relates to ice confections for human consumption having a high content of water as ice. One form of the confection is a pourable drink. Consumers of drinks, particularly in warm or humid environments want a cooling and refreshing drink to give them physical comfort.

BACKGROUND OF THE INVENTION

Consumers enjoy the cooling and refreshment provided by water ices and other ice confections such as ice cream. The most cooling form of water is ice, which may be optionally flavoured. A popular ice confection is an ice lolly which comprises ice frozen onto a stick by which it can be hand held. There are also slush drinks which comprise ice crystals in a syrup medium. These drinks provide cooling from their low temperature (about 0° C.) and the melting of the ice crystals. However, there is a limit to the amount of ice crystals which can be incorporated because they will form larger ice structures by crystal growth and sintering.

Thus there is a limit to the amount of ice which can be incorporated in a confection.

LITERATURE

Japanese laid open specification 61/139342 (Toii Shokuhin KogyoKK) describes an iced confection prepared by removing flakes from an ice block and adding them to a syrup. U.S. Pat. No. 4,031,262 (Eigo Tojo et al) describes incorporating ice granules in an ice cream to give cooling and refreshment.

EP 450692 describes the veneer-peeling of an aniostropic block of food material. The block may be a water-ice block and can be shaped in elongate form having a circular, polygonal or ellipsoidal cross-section.

EP 544349 described the addition of a coloured carrier material of partially gelatinised starch and colouring material to a liquid. The carrier material may be an ellipsoid.

GENERAL DESCRIPTION OF THE INVENTION

The invention provides a favourable ice confection which, optionally, can be consumed, that is drunk or eaten, to give a cooling sensation. It provides an ice confection comprising, at a temperature in the range from about 0° C. to about −20° C., i) a plurality of water ice particles having approximate oblate ellipsoidal form; and
ii) a deformable medium Preferably the water ice particles form at least about 5% preferably at least about 30%, preferably at least about 50% of the volume of the total confection to provide a high degree of refreshment as the ice melts. A higher delivery of cooling ice at the end of the consumption is provided by having the ice particles form at least about 60% by volume of the product. For the purpose of the invention these percentages refer to the bulk volume of the product.

It will be within the ability of the skilled person to vary the weight ratio of deformable medium to ellipsoidal particles. Low ratios from for example 20:1 can for example be found in liquid products comprising a syrup containing relatively low levels of ellipsoidal particles. Higher ratios say approaching infinity can be found in products where air constitues the deformable medium. If non-gaseous deformable media are used, normally the weight ratio can be up to 1:20 for example as found in containers filled with ellipsoidal particles, whereto a relatively small amount of syrup is added for enhancing the taste.

For the purpose of the invention the term oblate ellipsoidal form refers to particles having the general shape of convex lenses. Preferably the ellipsoidal particles have diameters in the range from about 3 to 12 millimeters, preferably 5 to 10 millimeters, and a radius of curvature for each face preferably from about 5 to 10 millimeters to provide optimum packing and flow. The radius of curvature for each of the faces may be the same but also possible is that they are different although preferably still within the range of 5 to 10 millimeters.

Preferably the ratio of the main dimension of the ellipsoidal particles to the smallest dimension (the depth) is between 1:0.6 to 1:0.2, more preferred 1:0.5 to 1:0.3.

Preferably the water ice-particles have smooth outer surfaces to allow the easy sliding of the particles past each other. However, non-smooth particles can sometimes also be used. The water ice particles are preferably sufficiently smooth to allow their touching surfaces to slide past each other.

The ellipsoidal particles allow a high proportion of the volume to be in the form of ice with the total product retaining its deformable properties because of the ellipsoids packed in a non-random structure. When the product is deformed the particles can slide past each other to give a smooth flow of product into a container, eg cup, or when moved in the mouth. The deformable medium allows the total ice confection to be deformed when subjected to pressure in the mouth during consumption.

The deformable medium suitably to be used can be any medium which is deformable such that the water ice particles can be mixed into the medium.

In a first preferred embodiment of the invention the deformable medium is flowable ie. in liquid form. Suitable flowable deformable media are for example water, syrup, fruit juice, liquor etc. Preferably the flowable deformable medium is flavoured eg. sweetened. The solids level of a flavoured deformable medium may vary in a wide rage but is generally between 0.1 and 60 wt %, more general between 4 and 55 wt %. When the medium is flowable, eg a syrup, the total composition is preferably pourable and can be drunk from a container. Other flowable deformable media are fruit juices which are optionally concentrated.

In a second preferred embodiment of the invention the deformable medium can be non-flowable. Examples of non-flowable deformable mediums are ice cream, sorbets, frozen custards, frozen yoghurts and milk ices. These will all contain ice crystals as a component of their normal structure and thus will provide refreshment from the medium during eating. The ellipsoidal water ice particles, in this from of product, can provide a flavour at the end of the mouthful. In this embodiment they would preferably be present at a level of about 10% by volume.

In a third preferred embodiment of the invention the deformable medium is gaseous e.g. carbon dioxie, nitrous oxide or air.

Also a combination of the above deformable mediums may De used, for example a container filled with ellipsoidal particles, whereby part of the voids are filled with syrup and the remaining part of the voids by air.

The water ice oblate ellipsoidal particles have two convex surfaces which meet at an edge which is preferably a continuous edge. Although other shapes are possible this edge is preferably circular. The invention thus includes shapes which provide the desired properties of sliding movement and orientated packing to give a low void volume. These particle shapes give approximations to oblate ellipsoids as they melt. The shapes will give a high melting surface area in the mouth without producing sharp edges.

The particles have a general shape of convex lenses. The plan view is preferably circular, but other forms e.g. an approximate square plan are included in the invention.

The ellipsoidal particles will usually have the same dimensions, this is easily achieved by a standard production method, but some products may benefit from containing particles in two or more sizes but with same geometric form. Thus with the ellipsoid particles having diameters in the range of about 3 to about 12 mm, ellipsoids having diameters from about 0.3 to 1.0 mm would give efficient packing.

The ellipsoidal particles have the desired flowable properties which allows the total confection to be deformable with a high content of ice for refreshment. Spherical particles would provide a higher ice content because of more efficient packing, but would not provide a smooth mouth feel and flow less easily. At the other extreme flat plates of ice would pack face to face to form clusters and would melt to become thin and give sharp edges during consumption.

The structure formed by the smooth ellipsoidal particles is ordered and the relatively small volume of voids in the structure is filled with the deformable medium or contain ellipsoids about ten times smaller. The product has a smooth mouth feel and can be formulated to give an initial flavour from the deformable medium with a final refreshing feeling as the ice particles melt. The ice particles are optionally flavoured and may be carbonated. The medium may be aerated, eg carbonated. For some media aeration can reduce viscosity.

When a syrup is the deformable medium, it will preferably have a certain solute ice crystals content, eg sugar, to ensure a relatively low content of small (30 to 100 microns) ice crystals at the temperature of consumption. Preferably some ice crystals will be formed in the deformable medium using standard processes to increase the total ice volume. The ice crystals will usually be present at a level of at most about 35% by volume, preferably at most about 20% by volume. Generally the ice crystal level is more than 5%.

The oblate ellipsoidal water ice particles for use in products of the invention can be produced by any suitable method for the preparation of water ice particles for example single or double drum freezing, mould freezing and shaping.

SPECIFIC DESCRIPTION OF THE INVENTION

Examples of the product will now be described to illustrate, but not limit, the invention.

EXAMPLE I

The small water ice particles were prepared using a block of polytetrafluoroethylene (PTFE) having circular indentations, diameter 10 mm, machined in the upper surface. The surface within the indentation had a radius of curvature of 8 mm to give a maximum depth of approximately 2 mm. Degassed, soft mineral water was placed in the indentations and formed oblate spheroids because the meniscus gave a curved upper surface. The PTFE has a high contact angle with water. Other non-wetting surfaces can be used in this process or the particles can be formed by freezing water in a volume between separable surfaces. The PTFE block was placed in a blast freezer at −35° C. The disc shaped particles were removed by bending the block. They were then stored at −20° C. In this form the ellipsoidal discs remain essentially free flowing. Any sintering being easily reversed by gentle agitation. When using the block care must be taken to avoid condensation on the surface because this will cause the water in the indentations to spread. The particles obtained were clear ice.

The aqueous syrup was prepared using the composition.

|  | % wt |
| --- | --- |
| Lemon concentrate | 0.8 |
| Sucrose | 25.0 |
| Dextrose monohydrate | 7.0 |
| Corn syrup (Cerestar 64 DE) | 5.0 |
| Maltodextrin (MD 40) | 4.0 |
| Locust bean gum | 0.1 |
| Citric acid (an hydrous) | 0.5 |
| Malic acid | 0.3 |
| Sodium citrate dihydrate | 0.25 |
| Flavour (lemon) | 0.1 |
| Water | 56.95 |
|  | 100.00 |

The ingredients, except the flavour and lemon concentrate, were heated while being stirred at 80° C. for 15 minutes. The remaining ingredients were added and the mixture cooled to 20° C. This syrup was frozen by adding it dropwise to liquid nitrogen. The frozen drops were removed by sieve and equilibrated at −20° C. The freezing step to form a syrup containing ice crystals can be achieved using a scraped surface heat exchanger.

The product was assembled by allowing the syrup to warm to −10° C. when it contained 26.7% wt ice crystals, and adding the ice particles in a weight ration of 3:2. The resulting product was then stored at −15° C. to −20° C. When consumed it gave a lemon flavour from the syrup followed by the refreshment of melting ice.

EXAMPLE II

Ice particles prepared according to Example I were mixed with a standard ice cream having 100% overrun and containing about 30% by weight ellipsoidal ice particles. The ice confection, when consumed, gave a smooth mouth feel as the ellipsoidal particles moved over each other as the ice cream medium deforms.

I claim:

1. A deformable ice confection comprising, at a temperature in the range from about 0° C. to about −20° C.,
    i) a plurality of water ice particles having oblate ellipsoidal form, each of the ice particles comprises two convex surfaces which meet at a continuous edge, the ice particles do not significantly sinter to form larger ice structures and remain essentially free flowing during frozen storage; and
    ii) a deformable medium.

2. An ice confection according to claim 1 wherein the ellipsoidal water ice particles form at least 5% of the volume of the total confection.

3. An ice confection according to claim 1 wherein the ellipsoidal ice particles have diameters in the range from about 3 to 12 millimeters and a radius of curvature for each face from about 5 to about 10 millimeters.

4. An ice confection according to claim 1 wherein the ratio of the main dimension of the particles to the smallest dimension of the ellipsoidal ice particles is between 1:0.6 to 1:0.2.

5. An ice confection according to claim 1 wherein the deformable medium is syrup.

6. An ice confection according to claim 2 wherein the ellipsoidal water ice particles form at least about 60% of the volume of the confection.

7. An ice confection according to claim 5 wherein the syrup medium contains at most about 35% of ice crystal by volume.

* * * * *